(12) United States Patent
Pentland et al.

(10) Patent No.: US 10,908,924 B2
(45) Date of Patent: Feb. 2, 2021

(54) SYSTEM AND METHODS FOR LOADING OBJECTS FROM HASH CHAINS

(71) Applicant: Intuit Inc., Mountain View, CA (US)

(72) Inventors: Ian Pentland, Boston, MA (US); Michael Richard Gabriel, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/400,760

(22) Filed: May 1, 2019

(65) Prior Publication Data

US 2020/0348949 A1    Nov. 5, 2020

(51) Int. Cl.
   *G06F 9/44*    (2018.01)
   *G06F 11/36*   (2006.01)
   *G06F 9/46*    (2006.01)
   *G06F 9/445*   (2018.01)
   *G06F 8/71*    (2018.01)
   *G06F 9/54*    (2006.01)
   (Continued)

(52) U.S. Cl.
   CPC ............ *G06F 9/44521* (2013.01); *G06F 8/71* (2013.01); *G06F 8/52* (2013.01); *G06F 8/656* (2018.02); *G06F 9/4493* (2018.02); *G06F 9/44578* (2013.01); *G06F 9/5055* (2013.01); *G06F 9/5072* (2013.01); *G06F 9/548* (2013.01)

(58) Field of Classification Search
   CPC ...... G06F 9/4493; G06F 9/548; G06F 9/5055; G06F 9/5072; G06F 9/3004; G06F 9/44578; G06F 9/541; G06F 9/44521; G06F 11/3684; G06F 11/3664; G06F 11/2064; G06F 8/71; G06F 8/52; G06F 8/656; G06F 8/4441; G06F 9/449; G06F 9/546; G06F 9/547; H04L 67/2861; H04L 67/325

See application file for complete search history.

(56) References Cited

U.S. PATENT DOCUMENTS 6,282,581 B1 * 8/2001 Moore ................... G06F 9/548
                                                   719/316
6,304,882 B1 * 10/2001 Strellis ................ G06F 11/2064
(Continued)

OTHER PUBLICATIONS

Michael Philippsen et al., More efficient serialization and RMI for Java, 2000, [Retrieved on Sep. 26, 2020]. Retrieved from the internet: <URL: https://onlinelibrary.wiley.com/doi/pdf/> 24 Pages (495-518) (Year: 2000).*

(Continued)

*Primary Examiner* — Anibal Rivera
(74) *Attorney, Agent, or Firm* — Ferguson Braswell Fraser Kubasta PC

(57) ABSTRACT

A method for loading objects from hash chains. A version chain of a class for a serialized object is located in an instance block of an instance chain. A class version of the serialized object is compared to a current version of the class. When the class version of the serialized object matches the current version of the class, a runtime object is loaded by deserializing the serialized object. When the class version of the serialized object does not match the current version of the class: one or more field values are extracted from the serialized object; a converter function is applied to the one or more field values to generate one or more converted field values; and a runtime object that matches the current version is loaded with the one or more converted field values.

20 Claims, 8 Drawing Sheets

(51) Int. Cl.
  *G06F 8/52*   (2018.01)
  *G06F 9/448*  (2018.01)
  *G06F 9/50*   (2006.01)
  *G06F 8/656*  (2018.01)

(56) References Cited

U.S. PATENT DOCUMENTS

| | | | | |
|---|---|---|---|---|
| 6,502,102 | B1* | 12/2002 | Haswell | G06F 11/3664 |
| 6,701,514 | B1* | 3/2004 | Haswell | G06F 11/3664 |
| | | | | 707/999.102 |
| 6,907,546 | B1* | 6/2005 | Haswell | G06F 11/3684 |
| | | | | 714/38.11 |
| 7,207,002 | B2* | 4/2007 | Mireku | G06F 40/197 |
| | | | | 715/234 |
| 7,395,536 | B2* | 7/2008 | Verbeke | G06F 9/5055 |
| | | | | 709/200 |
| 7,533,141 | B2* | 5/2009 | Nadgir | G06F 9/5072 |
| | | | | 370/395.1 |
| 8,856,380 | B2* | 10/2014 | DelloStritto | G06F 13/387 |
| | | | | 709/236 |
| 10,129,361 | B2* | 11/2018 | Raja | H04L 67/2861 |
| 10,572,855 | B1* | 2/2020 | Levy | G06K 19/0723 |
| 2003/0005169 | A1* | 1/2003 | Perks | G06F 9/4493 |
| | | | | 719/315 |
| 2003/0145315 | A1* | 7/2003 | Aro | G06F 9/547 |
| | | | | 717/170 |
| 2004/0167937 | A1* | 8/2004 | Sirois | G06F 9/4493 |
| 2005/0055380 | A1* | 3/2005 | Thompson | G06F 16/188 |
| 2005/0108627 | A1* | 5/2005 | Mireku | G06F 40/197 |
| | | | | 715/234 |
| 2006/0218538 | A1* | 9/2006 | van Kesteren | G06F 8/52 |
| | | | | 717/137 |
| 2007/0150478 | A1* | 6/2007 | Cho | H04L 67/34 |
| 2007/0150595 | A1* | 6/2007 | Bhorania | H04L 67/325 |
| | | | | 709/226 |
| 2008/0082683 | A1* | 4/2008 | DelloStritto | G06F 9/546 |
| | | | | 709/236 |
| 2008/0120129 | A1* | 5/2008 | Seubert | G06Q 10/10 |
| | | | | 705/35 |
| 2010/0077410 | A1* | 3/2010 | Graser | G06F 9/548 |
| | | | | 719/330 |
| 2011/0283256 | A1* | 11/2011 | Raundahl Gregersen | |
| | | | | G06F 8/656 |
| | | | | 717/108 |
| 2015/0222730 | A1* | 8/2015 | Gower | H04L 65/607 |
| | | | | 709/203 |
| 2015/0256484 | A1* | 9/2015 | Cameron | G06F 9/547 |
| | | | | 709/226 |
| 2015/0378752 | A1* | 12/2015 | Stoodley | G06F 8/4441 |
| | | | | 717/166 |
| 2016/0191316 | A1* | 6/2016 | Guntaka | H04L 41/082 |
| | | | | 370/254 |

OTHER PUBLICATIONS

Gul Agha et al., Concurrent Objects and Beyond, 2014, [Retrieved on Sep. 26, 2020]. Retrieved from the internet: <URL: https://link.springer.com/content/pdf/10.1007%2F978-3-662-44471-9.pdf> 479 Pages (1-479) (Year: 2014).*

* cited by examiner

SYSTEM AND METHODS FOR LOADING OBJECTS FROM HASH CHAINS

BACKGROUND

Computer programming objects store information with sets of fields. The state of an object is determined by the values for the fields of the object. Hash chains may be used within objects to store historical field values and states of the object. Objects may be updated and rewritten using different versions that have different field names, values, data types, functions, methods, and logic to store and process information. Objects of one version may not be compatible with objects of another version. Furthermore, objects from one programming language may be incompatible with the same object written with a different programming language. Better methods are needed for storing and loading objects of different versions using different programming languages with hash chains.

SUMMARY

In general, in one aspect, one or more embodiments relate to a method for loading objects from hash chains. A version chain of a class for a serialized object is located in an instance block of an instance chain. A class version of the serialized object is compared to a current version of the class. When the class version of the serialized object matches the current version of the class, a runtime object is loaded by deserializing the serialized object. When the class version of the serialized object does not match the current version of the class: a version block in the version chain is located that matches the class version of the serialized object; one or more field values are extracted from the serialized object; a converter function from the version block is applied to the one or more field values to generate one or more converted field values; and a runtime object that matches the current version is loaded with the one or more converted field values.

In general, in one aspect, one or more embodiments relate to a system for loading objects from hash chains. The system includes a memory coupled to a computer processor. The memory includes a runtime object, wherein the runtime object executes on the computer processor and uses the memory. A version chain of a class for a serialized object is located in an instance block of an instance chain. A class version of the serialized object is compared to a current version of the class. When the class version of the serialized object matches the current version of the class, a runtime object is loaded by deserializing the serialized object. When the class version of the serialized object does not match the current version of the class: a version block in the version chain is located that matches the class version of the serialized object; one or more field values are extracted from the serialized object; a converter function from the version block is applied to the one or more field values to generate one or more converted field values; and a runtime object that matches the current version is loaded with the one or more converted field values.

In general, in one aspect, one or more embodiments relate to a system for loading objects from hash chains. The system includes a memory coupled to a computer processor. The memory includes a runtime object, wherein the runtime object executes on the computer processor and uses the memory. A version chain of a class for a serialized object is located in an instance block of an instance chain. A class version of the serialized object is compared to a current version of the class. When the class version of the serialized object does not match the current version of the class: a version block in the version chain is located that matches the class version of the serialized object; one or more field values are extracted from the serialized object; a converter function from the version block is applied to the one or more field values to generate one or more converted field values; a subsequent converter function is applied to the one or more converted field values to generate the runtime object; and a runtime object that matches the current version is loaded with the one or more converted field values.

Other aspects of the invention will be apparent from the following description and the appended claims.

DETAILED DESCRIPTION

Figure 1A:
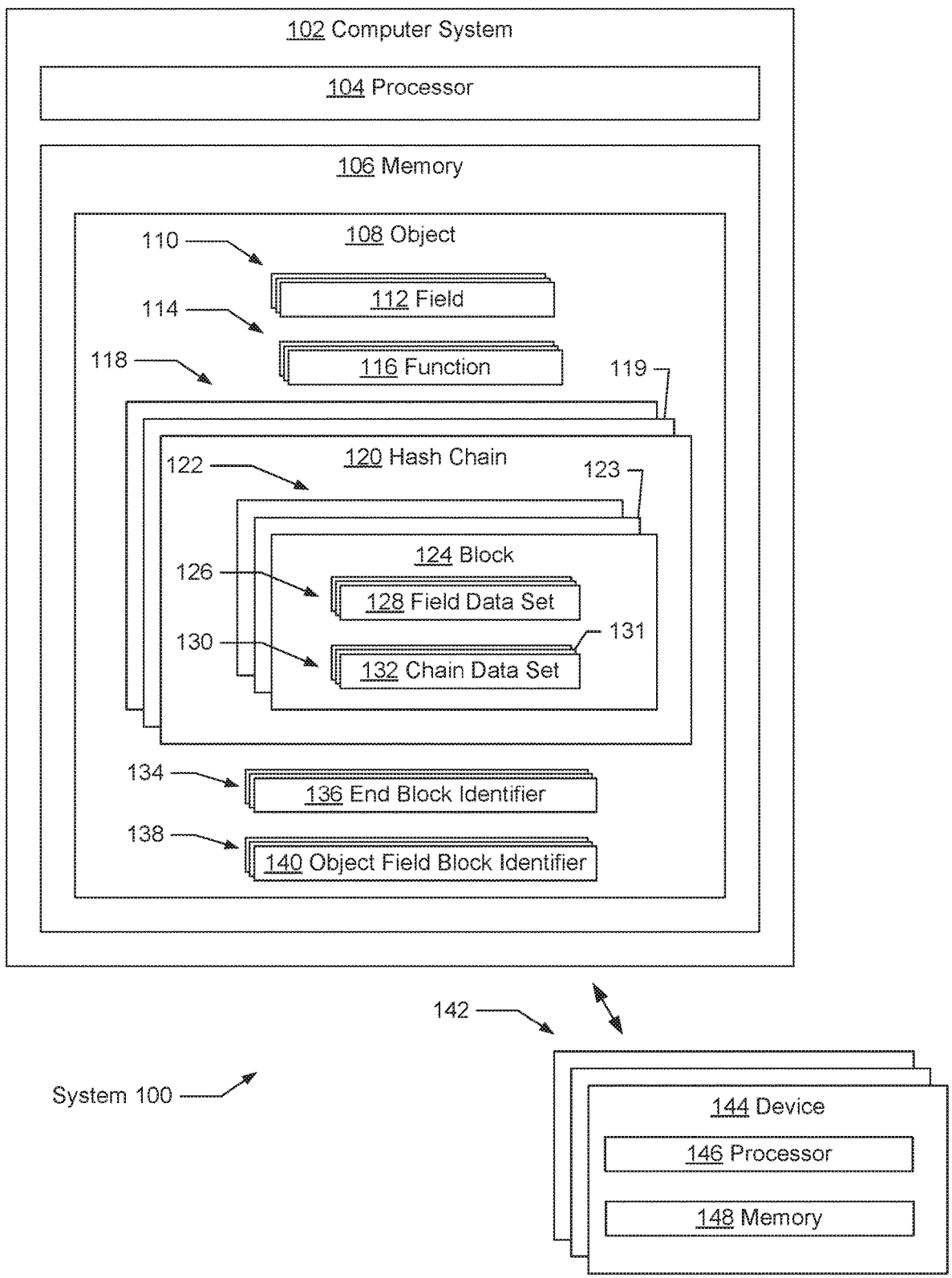
FIG. 1A, FIG. 1B, FIG. 1C, and FIG. 1D show a system in accordance with one or more embodiments of the present disclosure.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, the data of programming objects that are loaded and running on computer systems (i.e., runtime objects) is routinely updated. The data updates may be stored in a hash chain to form an immutable record of the historical values of the data. The source code and corresponding class versions of programming objects are also routinely updated and different versions of the same object may store data using different types and different fields. In one or more embodiments, a version chain and an instance chain are used to store the data of a programming object. In one or more embodiments, the blocks of the version chain store version information of the programming object and a converter function. The version information includes version specific data for the programming object. The converter function converts from the previous version of the programming object to the current version of the programming object. In one or more embodiments, the blocks of the instance chain store the data of the programming object and identify the class version of the programming object used to store the data in the instance block. Advantages of using version chains and instance chains include storing data from programming objects of multiple versions on the same instance chain without repeating the version information that is stored using the version chain.

In general, embodiments that are in accordance with the disclosure load computer programming objects from hash chains. The objects are stored using instance hash chains and version hash chains. The instance hash chains store data related to the fields of the object in instance blocks. An instance block includes a class identifier and a class version identifier. The class identifier uniquely identifies the class that defines the object. The class version identifier identifies the class version of the object. Data from the object is stored in the instance block and may include a serialized form of the object. The serialized form of the object, referred to as the serialized object, includes the field names and values of the object and may optionally include the functions and logic that the object uses to process data. The instance chain may include objects of different versions of the same class. To load the object of prior class versions, a version chain for the object is located and one or more converter functions from the version blocks of the version chain are applied to the field names and values that are stored in an instance block to generate converted field names and values that are in accordance with the current version of the class that defines the object. The converted field names and values are then used to instantiate a new object of the current version of the class. The version chain with converter functions used in conjunction with the instance chain allow objects of prior versions to be stored on the instance chain and loaded as a current version.

In general, a runtime object is serialized and saved into a data field set of an instance block as a serialized object. The fields and functions of the serialized objects are defined by a class that may be updated over time to have different fields, names, functions, logic, etc. Runtime objects that were serialized with a previous version of the class may be incompatible with the current version of the class. For example, the names of the fields of the class may have changed and the fully qualified class name itself may have also changed. The process loads serialized objects from instance blocks to runtime objects that are instances of the current version of the class, even when the serialized object was stored using previous versions of the class.

In general, one or more embodiments use multiple programming language environments to interact with the objects stored by the instance chain and the version chain. In one or more embodiments, the version blocks include the serialized converter functions that correspond to specific programming language environments. In one or more embodiments, the version blocks also include version serialized objects that correspond to specific programming language environments and allow runtime objects of previous versions of the class to be instantiated. In one or more embodiments, different version blocks include converter functions and version serialized objects for different languages.

As an example, an application is written in Java, but the converter function is written in Python. When the Java application converts data stored in the hash chain from an older version into a newer version, the Java application passes the serialized object and the converter function to a Python application that returns the serialized object transformed into the newer version. The Java application then deserializes the serialized object into a runtime object.

As another example, the Java application does not interact directly with the data stored in the hash chains. Instead, the Java application sends requests to a second application to retrieve a serialized object. That second application retrieves the serialized object, converts the serialized object to the latest version, and returns the converted serialized object to the Java application. With this approach, the Java application does not directly handle the versioning logic and may not even be aware that the serialized object was stored as a potentially older version.

FIG. 1A, FIG. 1B, FIG. 1C, and FIG. 1D show diagrams of the system (100) in accordance with one or more disclosed embodiments. The various elements of the system (100) may correspond to the computing system shown in FIG. 7A and FIG. 7B. In particular, the type, hardware, and computer readable medium for the various components of the system (100) is presented in reference to FIG. 7A and FIG. 7B. In one or more embodiments, one or more of the elements shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Referring to FIG. 1A, the system (100) includes the computer system (102) and the set of devices (142). The set of devices (142) may interact with the object (108) of the computer system (102).

Figure 7A:
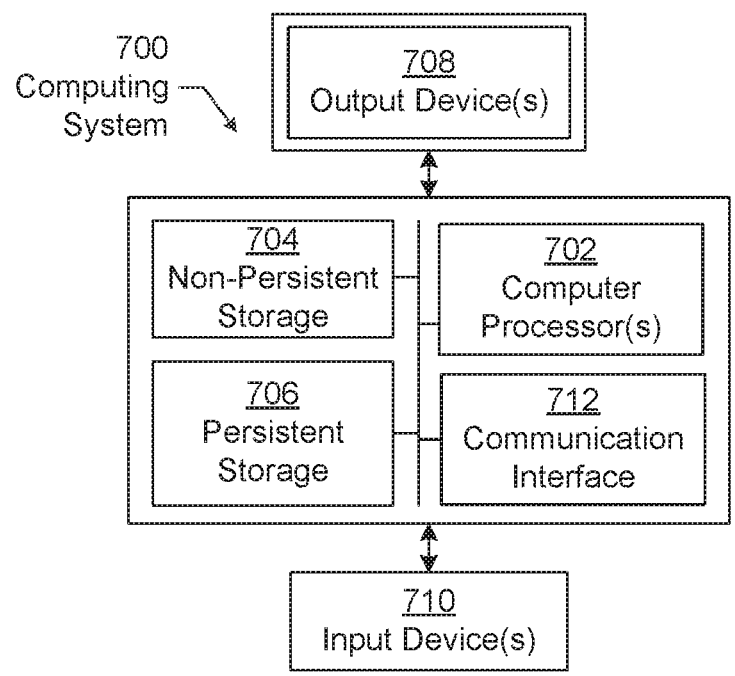
FIGS. 7A and 7B show computing systems in accordance with disclosed embodiments.
Figure 7B:
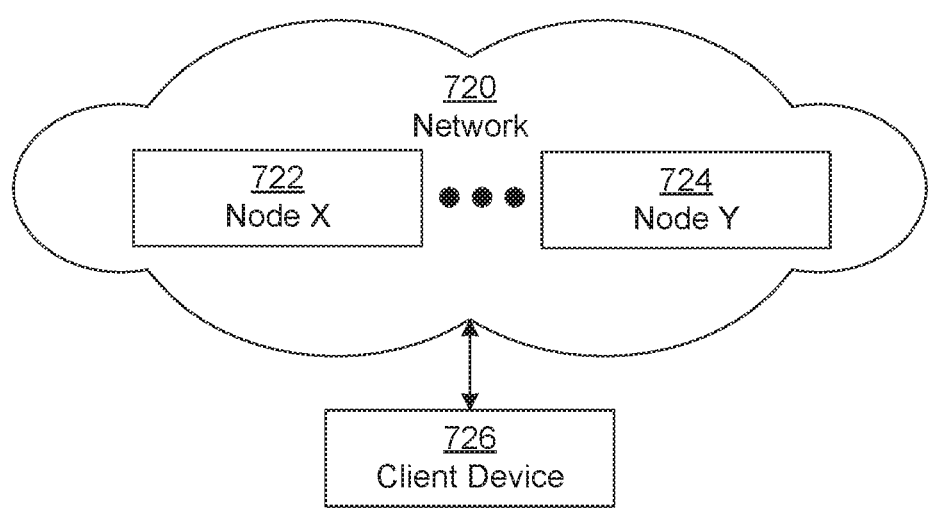

The computer system (102) is an embodiment of the computing system (700 in FIG. 7A) and nodes (722, 724 in FIG. 7B) described in FIGS. 7A and 7B, respectively. Returning to FIG. 1, the computer system (102) is a physical computing device with the computer processor (104) and the memory (106). The computer processor (104) executes the functions (114) of the object (108), which is stored in the memory (106).

In one or more embodiments, the object (108) is a programming object resident within the memory (106) formed from a combination of variables, functions, and data structures. The object (108) includes one or more fields (110), functions (114), hash chains (118), end block identifiers (134), and object field block identifiers (138). The object (108) may be of an object of a program written in an oriented programming language or may be a program written in a non-object oriented programming language. The object (108) may be written in any number of programming languages including Java, JavaScript, ANSI C, C++, Python, Perl, PHP, etc. In one or more embodiments, the object (108) is referred to as a runtime object when it is running on the computer processor (104). In one or more embodiments, the object (108) is defined by a class.

In one or more embodiments, the fields (110) are the variables of the object (108) that identify the state of the object (108). The fields (110) have names and values that are stored within the hash chains (118) as the field data sets (126). A field may be of any type including floating-point numbers, integers, characters, strings, other objects, etc. In one or more embodiments, the field (112) corresponds to the field data set (128) in the block (124) of the hash chain (120). The fields (110) include public fields that are accessible to objects and processes outside of the object (108) and includes private fields that are generally only accessible by the object (108). In one or more embodiments, the fields (110) include a private field for class identifier. In one or more embodiments, the class identifier is a universally unique identifier (UUID) that identifies the class of the object. In one or more embodiments, the fields (110) include a private field for a class version identifier that identifies the version of the class of the object.

In one or more embodiments, the functions (114) are sequences of program instructions that perform specific tasks for the object (108). The functions (114) include accessor functions that may read from and write to the fields (110) of the object (108) and may include functions to update the state of the object (108) by manipulating the values of the fields (110). The functions (114) include the function (116), which is an accessor function for the field (112) in one or more embodiments.

In one or more embodiments, the functions (114) include a converter function that converts data from a previous class version to a current version of the class. In one or more embodiments, the converter function takes in a map of field names to field values for the previous class version and transforms that input map into an output map of field names and values that are in accordance with the current version of the class that defines the object (108).

In one or more embodiments, the functions (114) include a deserializer function. In one or more embodiments, the deserializer function takes in a map of field names and values as an input and outputs a runtime object that is an instance of the class that defines the object (108). In one or more embodiments, instead of using a map, the deserializer function uses runtime reflection to inject values into the fields of an instance of the class. The runtime object returned by the deserializer function is in accordance with the current class version.

In one or more embodiments, the hash chains (118) include the hash chain (119) and the hash chain (120). The hash chains (118) record data that includes the values of the fields (110) of the object (108). The values of the fields (110) are recorded in the blocks (122) using a cryptographic hash function so that the historical values cannot be changed without detection. Suitable cryptographic hash algorithms for the cryptographic hash function used to store the values include Message Digest 5 (MD5), Secure Hash Algorithm (SHA), SHA-1, SHA-2, SHA-3, RACE Integrity Primitives Evaluation Message Digest (RIPEMD-160), Whirlpool, BLAKE, BLAKE2, etc.

In one or more embodiments, the hash chain (119) is a version chain. A version chain includes version blocks for the different versions of a class.

In one or more embodiments, the hash chain (120) is an instance chain. An instance chain includes instance blocks that record instances of objects that are defined by the class of the version chain. In one or more embodiments the instances are recorded by serializing an object and recording the serialized object in the field data set of the instance block.

In one or more embodiments, the blocks (122) include the present and historical values of the fields (110). The sequence of the blocks (122) is immutable so that any change to the order of the blocks (122) or the values within the blocks (152) is detectable by recalculating and verifying the hash values generated for each of the blocks (122). In one or more embodiments, the blocks (122) include the block (123) and the block (124).

In one or more embodiments, the block (124) is one of the blocks (122). The block (124) includes field data sets (126) and chain data sets (130), which are further described below in FIG. 1B and FIG. 1C. In one or more embodiments, the blocks (122) include summary blocks. A summary block includes values or identifiers for each of the fields (110) to record the state of the object (108) in the summary block.

In one or more embodiments, the blocks (122) include serialized objects in the field data sets. In one or more embodiments, the serialized objects themselves include serialized objects, referred to as nested serialized objects or nested objects.

In one or more embodiments, the end block identifiers (134) identify the end blocks of the hash chains (118). An end block of a hash chain is the most recently added block to the hash chain and is the block to which the next block of the hash chain is appended, which will become the next end block. An end block is also referred to as a tail block. In one or more embodiments, the end block identifier (136) identifies the block (124) as the end block of the hash chain (120).

In one or more embodiments, the object field block identifiers (138) identify blocks (122) within the hash chains (118). In one or more embodiments, the current state of the object (108) is identified with the object field block identifiers (138), which identify a set of blocks of the hash chains (118) that contain the current values for the fields (110). In one or more embodiments, the object field block identifier (140) of the object field block identifiers (138) identifies the block (124) as containing the current value for the field (112).

In one or more embodiments, the devices (142) include the device (144) and are used to access the object (108). In one or more embodiments, the device (144) is a computing system that executes one or more of programs on a physical computing device with processors (146) and memory (148), such as the computing system (700) and nodes (722, 724) described in FIGS. 7A and 7B. The devices (142) are described further below in FIG. 1D.

Figure 1B:
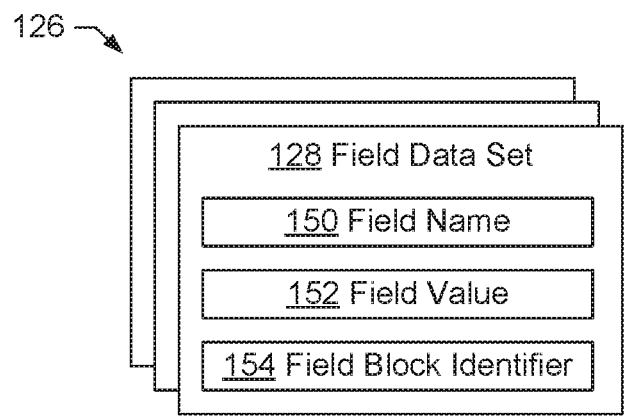

Referring to FIG. 1B, the field data sets (126) include the field data set (128) in accordance with one or more embodiments. In one or more embodiments, the field data sets (126) store the values of the fields (110) of the object (108). In one or more embodiments, the field data set (128) stores the value for the field (112) of FIG. 1A. The field data set (128) includes the field name (150), the field value (152), and the field block identifier (154). In one or more embodiments, the data that may be stored in a field data set includes the UUID of the object (108), the class version of the object (108), a serialized object form of the object (108), the fields (110), the functions (114), etc.

In one or more embodiments, the field name (150) identifies one of the fields (110) that is related to the field data set (128). In one or more embodiments, the field name (150) identifies the name of the field (112).

In one or more embodiments, the field value (152) stores the value of a field of the object (108). The field value (152) may be any data type including an integer, a floating point value, a character, string, another object, a serialized version of another object, etc. In one or more embodiments, the field value (152) is the value for the field (112) of FIG. 1A, which is identified by the field name (150).

In one or more embodiments, the field block identifier (154) identifies a block with a value for a field of the object. In one or more embodiments, instead of storing the value of the field in a block, the field block identifier (154) identifies another block in one of the hash chains (118) that includes the value of the field. For example, instead of storing the value of the field in the field value (152), the field block identifier (154) may be used to identify a different block that includes the field value and the field name. The field block identifier (154) may be used in a summary block to reduce the amount of memory required for the summary block, such as when the field is another object, which may be large and complex.

Figure 1C:
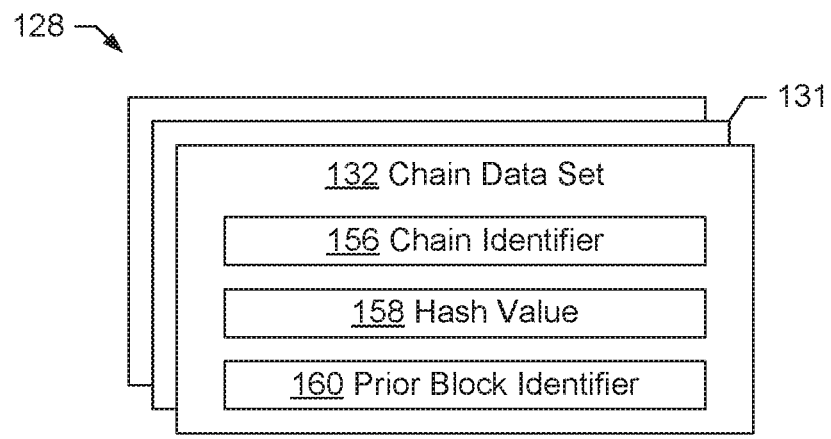

Referring to FIG. 1C, the chain data sets (128) include the chain data set (131) and the chain data set (132) in accordance with one or more embodiments. The chain data sets (128) store hash chain information for the block (124) that relates the block (124) to one or more of the hash chains (118) of the object (108). The block (124) may include chain data sets (128) that identify the hash chains (118) to which the block (124) belongs. As an example, the chain data set (132) links the block (124) to the hash chain (120) and the chain data set (131) links the block (124) to the hash chain (119). The chain data set includes the chain identifier (156), the hash value (158), and the prior block identifier (160).

In one or more embodiments, the chain identifier (156) identifies one of the hash chains (118) to which the block (124) belongs. In one or more embodiments, the chain identifier (156) identifies that the block (124) belongs to the hash chain (120).

In one or more embodiments, the hash value (158) is a cryptographic hash value generated for the block (124). In one or more embodiments, the hash value (158) is generated by applying a cryptographic hash algorithm to the field data sets (126) for the block (124) and the hash value of the prior block in the hash chain identified with the chain identifier (156). As an example, when the block (124) includes a single field with the value stored in the field data set, then the field value and the hash value of the prior block are combined by appending the hash value to the field value to form a message. The cryptographic hash algorithm is then applied to the message. When the block (124) includes multiple field values, the multiple field values are combined with the prior block hash value, such as by appending the multiple field use together and then appending the prior block hash value to form the message that is then hashed with the cryptographic hash algorithm. When the block (124) includes field block identifiers, the field values may be retrieved using the field block identifiers to form the message or the field block identifiers may be used in place of the field values to form the message. The message used to generate the hash value (158) includes one or more field values and field block identifiers and includes the prior block hash value. The message is hashed with a cryptographic hash algorithm to form the hash value (158).

In one or more embodiments, the prior block identifier (160) identifies a prior block in the hash chain of the block (124). In one or more embodiments, the prior block identifier may be the hash value of the prior block. In one or more embodiments, the prior block identifier (160) identifies the block (123) from FIG. 1A as the block that is immediately preceding the block (124) in the hash chain (120).

Figure 1D:
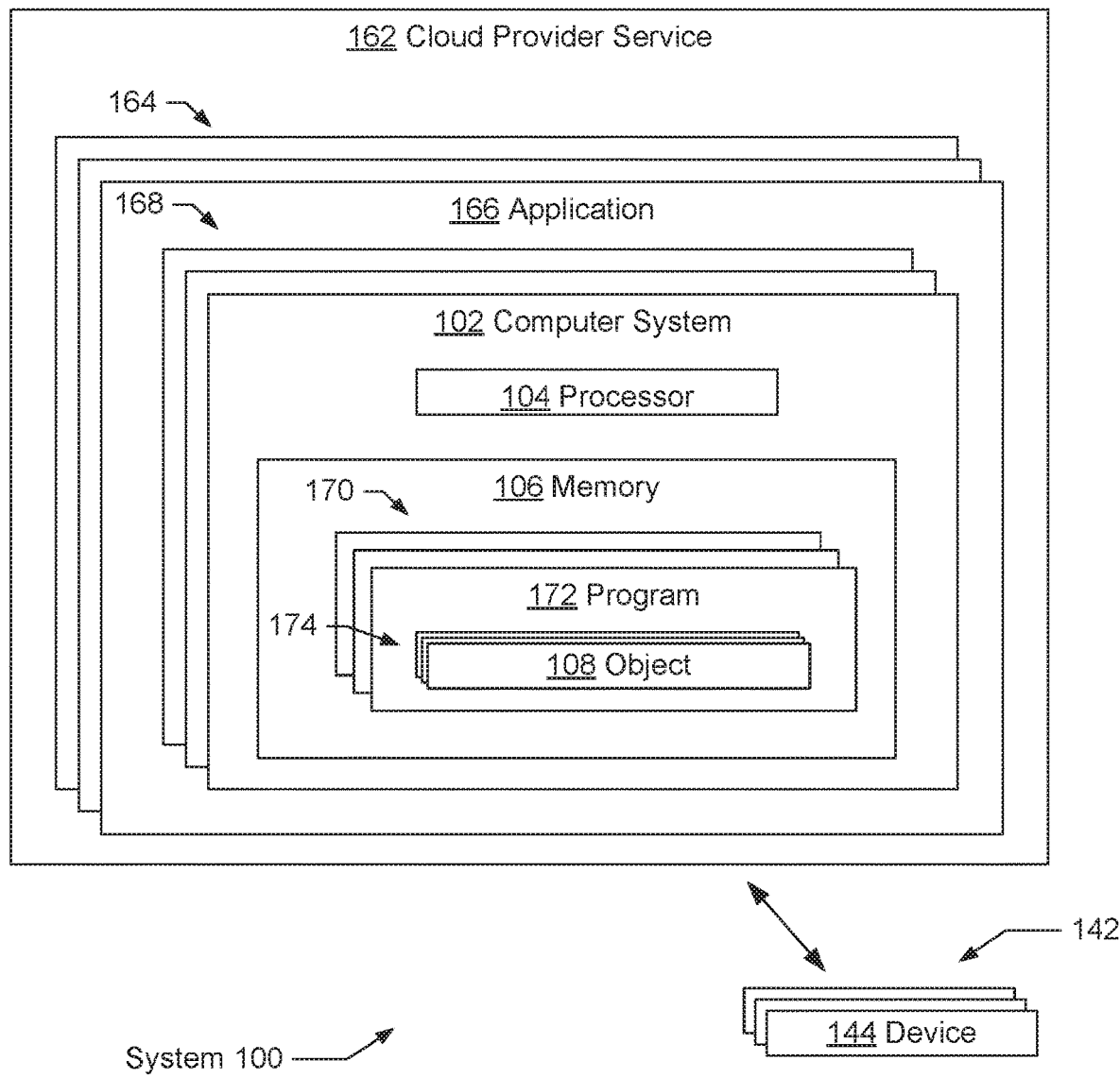

Referring to FIG. 1D, an example is shown where the cloud provider service (162) hosts the application (166), which includes the program (172), which includes the object (108). The cloud provider service (162) provides the information technology infrastructure for deploying distributed applications and web services, including the applications (164).

In one or more embodiments, the applications (164) include the application (166). In one or more embodiments, the application (166) is a distributed application that operates on the computer systems (168). As an example, the application (166) may be a web service, such as a website, and may be accessible to the devices (142) through a representational state transfer (RESTful) application programming interface (API).

The computer systems (168) include the computer system (102). In one or more embodiments, the computer systems (168) include the programming instructions and data for executing the application (166).

The computer system (102) includes the computer processor (104) and the memory (106), as described in FIG. 1A. The memory (106) includes the programs (170).

In one or more embodiments, the programs (170) execute a part of the application (166) on the computer system (102). The programs (170) may be written in any number of programming languages including Java, JavaScript, ANSI C, C++, Python, Perl, PHP, etc. The programs (170) include the program (172), which includes the objects (174), which include the object (108). Programs written in languages that are not object oriented may still be treated as programming objects, such as by using shell commands and scripts to interface the programs.

In one or more embodiments, the objects (174) form the program (172), which executes a part of the application (166). The objects (174) include the object (108), which is further described with respect to FIG. 1A.

The devices (142) include the device (144), which may interact with the application (166). As an example, when the application (166) is a website, the device (144) may use a web browser to access the website provided by the application (166), which uses the object (108).

Figure 2:
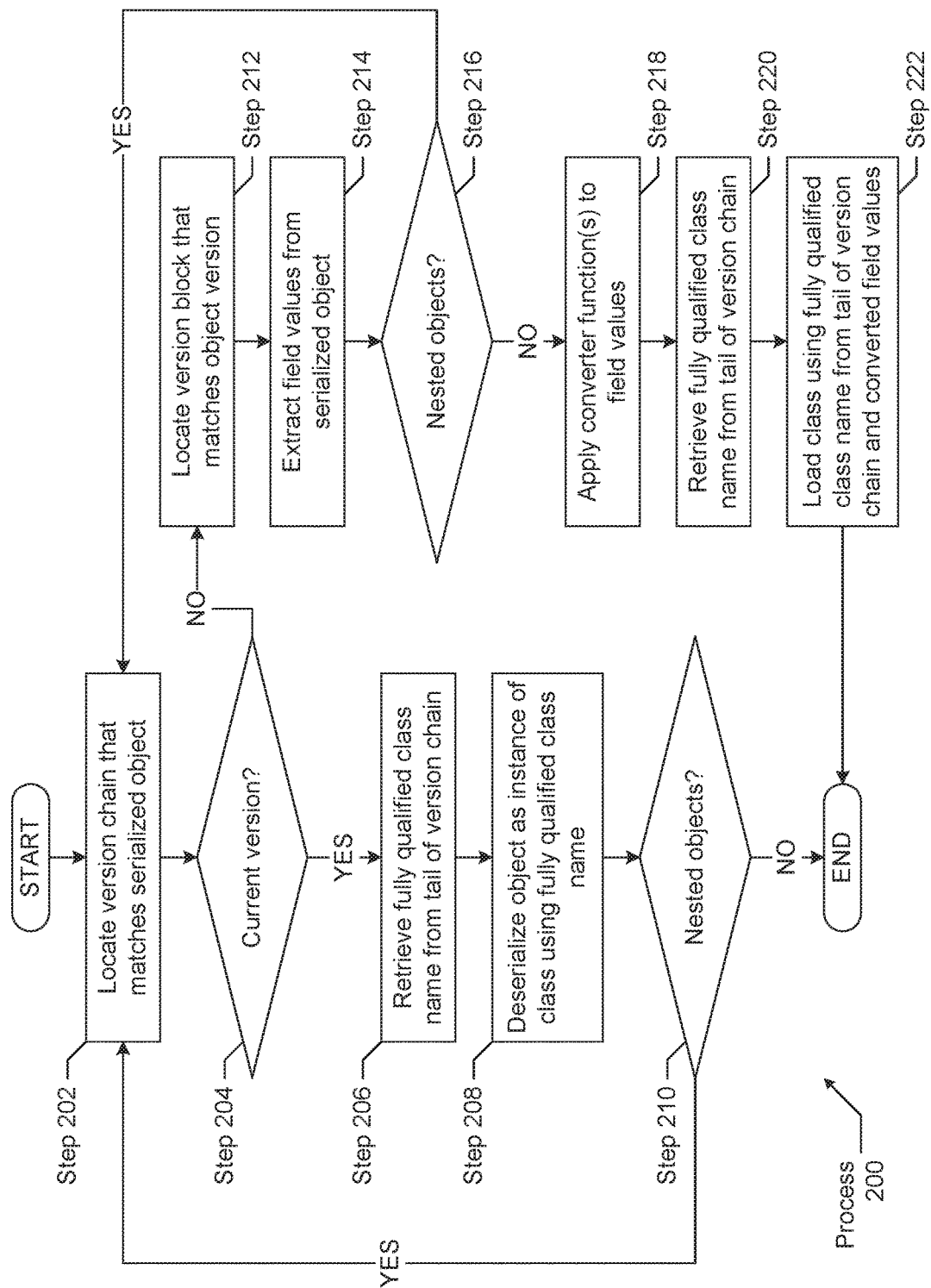
FIG. 2, FIG. 3, and FIG. 4 show flowcharts of methods in accordance with one or more embodiments of the present disclosure.

FIG. 2 shows a flowchart in accordance with one or more embodiments of the disclosure. The flowchart of FIG. 2 depicts a process (200) for loading serialized objects regardless of the version of the object. The process (200) may be implemented on one or more components of the system (100) of FIG. 1. In one or more embodiments, one or more of the steps shown in FIG. 2 may be omitted, repeated, combined, and/or performed in a different order than the order shown in FIG. 2. Accordingly, the scope of the present disclosure should not be considered limited to the specific arrangement of steps shown in FIG. 2.

In Step 202, a version chain is located that matches the serialized object. In one or more embodiments, the version chain is matched to the serialized object when the class identifier (e.g., a UUID) of the version chain matches the class identifier of the serialized object.

In Step 204, the class version of the serialized object is compared to the current version of the class. In one or more embodiments, the class version identifier of the serialized object is compared to the class version identifier from a field data set in the tail version block of the version chain that identifies the current version of the class. When the class version of the serialized object matches the current version of the class, the process (200) proceeds to Step 206. When the class version of the serialized object does not match the current version of the class, the process (200) proceeds to Step 212.

In Step 206, the fully qualified class name is retrieved. In one or more embodiments, the current fully qualified class name is stored in and retrieved from the tail version block of the version chain.

In Step 208, the serialized object is deserialized as an instance of the class using the fully qualified class name. In one or more embodiments, the class version of the serialized object has matched the current version of the class so that the serialized object is deserialized without having to remap, rename, or convert the names, values, fields, and functions of the serialized object.

In Step 210, nested objects are processed. The nested objects are serialized objects within the original serialized object. For the nested objects within the serialized object, the process (200) is repeated starting from Step 202 to load runtime objects that correspond to the nested objects and are nested within the runtime object loaded from the original serialized object. When there are no nested objects, the process (200) terminates.

In Step 212, a version block that matches the class version of the serialized object is located. In one or more embodiments, the class version identifiers of the version blocks of the version chain are compared to the class version identifier of the serialized object to locate the version block that is closest to the tail version block of the version chain and that includes a matching class version identifier. In one or more embodiments, the comparisons are performed starting from the tail version block and then proceed to the prior version blocks in the chain one at a time. When the entire version chain has been traversed and no version block has been located that matches the version of the serialized object, an error is generated and the process (200) terminates.

In Step 214, field values are extracted from the serialized object. In one or more embodiments, the field values and field names are extracted into a map of the field values and field names.

In Step 216, nested objects are processed. When a field value to be extracted in Step 214 includes a nested object (a serialized object within the original serialized object) the process (200) repeats from Step 202 to properly load the nested object of the field. When there are no more nested objects, the process (200) proceeds to Step 218.

In Step 218, converter functions are applied to the field values. In one or more embodiments, a converter function is applied by deserializing the converter function from the version block and applying the converter function to the map of field values and field names to generate a converted map of field values and field names. In one or more embodiments, the converter functions that are applied to the field values include the converter functions of the intermediate version blocks that are between the matching version block and the tail version block and include the converter function of the tail version block. A converter function converts from an immediately prior version to a subsequent version. For example, the matching block may convert from version 1.0 to version 1.1, an intermediate version block may convert from version 1.1 to version 2.0, and the tail version block may convert from version 2.0 to version 3.0.

In Step 220, the fully qualified class name is retrieved. In one or more embodiments, the current fully qualified class name is stored in and retrieved from the tail version block of the version chain.

In Step 222, the class is loaded as a runtime object using the fully qualified class name and the converted field values. In one or more embodiments, the runtime object is loaded by applying a deserializer function to the converted map to generate the runtime object, which matches the current version of the class. The deserializer function constructs an instance of the current version of the class as a runtime object using the names and values from the converted map.

In one or more embodiments, the runtime object is loaded using runtime reflection. An instance of the current version of the class is instantiated as a runtime object and the converted field values are injected into the runtime object.

Figure 3:
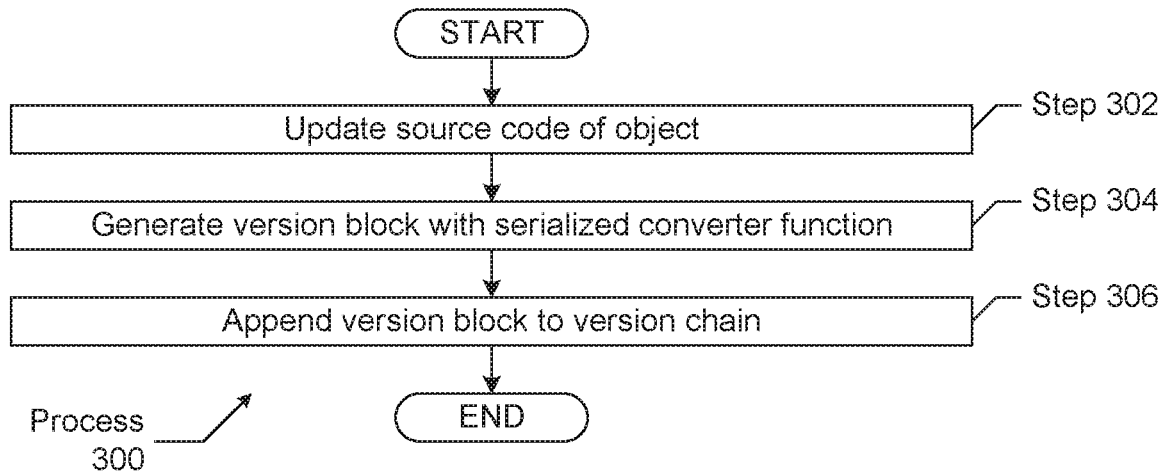

FIG. 3 shows a flowchart in accordance with one or more embodiments of the disclosure. The flowchart of FIG. 3 depicts a process (300) for reading from a hash chain. The process (300) may be implemented on one or more components of the system (100) of FIG. 1. In one or more embodiments, one or more of the steps shown in FIG. 3 may be omitted, repeated, combined, and/or performed in a different order than the order shown in FIG. 3. Accordingly, the scope of the present disclosure should not be considered limited to the specific arrangement of steps shown in FIG. 3.

In Step 302, source code of an object is updated. The updated source code for an object may include different fields, a different class name, and different functions compared to the previous version of the source code for an object. In one or more embodiments, the updates to the source code are made to a source code repository. The updated source code includes a converter function that can convert the fields of an object of a previous version to the fields used by the current version. The converter function can rename fields as well as apply additional conversions. For example, a previous version of an object includes a field named "length_in_inches" with a value stored in an integer representing a number of inches. The current version of the object replaces the "length_in_inches" field with a "length_in_meters" field that uses a floating point number that represents the number of meters. The converter function converts the integer value of inches into a floating point value of meters by converting the inches data type to a floating point data type and multiplying the number of inches by 0.0254.

In Step 304, a version block is generated with a serialized converter function. In one or more embodiments, the version block includes the class UUID, a version identifier that identifies the new version of the class, the fully qualified class name for the class. The class UUID identifies the class and does not change between different versions of the class. In one or more embodiments, the version identifier includes a number with a higher numerical value than the previous version of the class. In one or more embodiments, the fully qualified class name is a string value that identifies the class of an object and can be renamed in different versions of the class. Additional detail for generating the version block is provided in FIG. 4 below.

In Step 306, the version block is appended to the version chain. In one or more embodiments, the version block is appended as the end block, also referred to as the tail block, of the version chain. The tail block of the version chain identifies the current version of the class and new instances of the class will be generated as runtime objects of the current version identified in the tail block.

Figure 4:
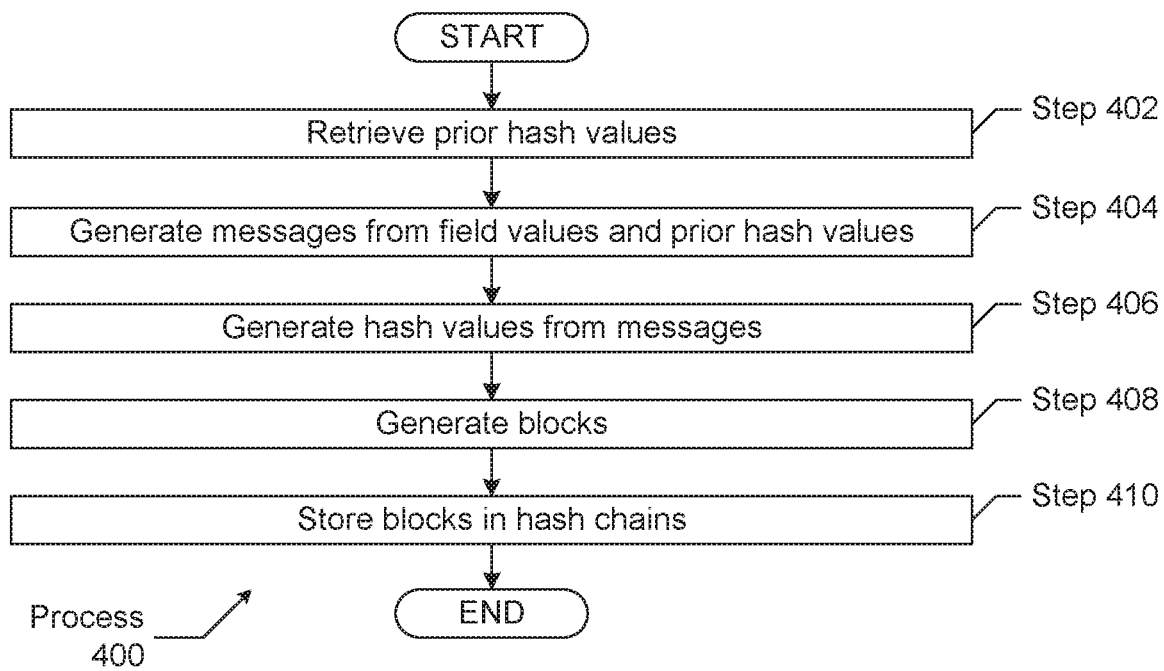

Referring to FIG. 4, the flowchart of FIG. 4 depicts a process (400) for writing blocks to hash chains. The process (400) may be implemented on one or more components of the system (100) of FIG. 1. In one or more embodiments, one or more of the steps shown in FIG. 4 may be omitted, repeated, combined, and/or performed in a different order than the order shown in FIG. 4. Accordingly, the scope of the present disclosure should not be considered limited to the specific arrangement of steps shown in FIG. 4.

In Step 402, prior hash values are retrieved. In one or more embodiments, the end blocks are identified and the hash values from the chain data of the end blocks are retrieved. In one or more embodiments, when a version chain or instance chain is being written to, the prior hash value is retrieved from the end of block of the version chain or instant chain, respectively.

In Step 404, messages are generated from field data sets and prior hash values. The messages are the inputs to a cryptographic hash function. The messages are generated by combining field values for the new blocks with the hash values from the prior blocks. One or more of the field names, field values (including serialized objects), and field block identifiers may be appended together with the hash value from a prior block to form a message, which may be in a binary or serialized format. Version data is stored in either a field data set or a chain data set. When stored in a field data set, the version data becomes part of the message used to generate the hash value. When stored in a chain data, the version data is not part of the message used to generate the hash value.

In Step 406, hash values are generated from messages. The messages generated from the field data are inputs to a cryptographic hash function that outputs hash values for the messages.

In Step 408, blocks are generated. In one or more embodiments, the blocks are generated by collecting all of the information for the field data sets and chain data sets into the blocks.

In one or more embodiments, the field data collected for a version block includes an identifier for the new version of the class, the fully qualified class name, and a serialized form of a converter function.

In one or more embodiments, the field data collected for instance block includes a class identifier (e.g., a UUID), the name of the instance, the class version of the instance, and one or more field data sets. In one or more embodiments, a field data set in the collected information includes a serialized object, which is the serialized form of a runtime object.

The chain data sets include the hash chain identifiers, hash values, and prior block identifiers that are needed to integrate the blocks into the hash chains. The prior block identifiers identify the current end blocks of the hash chains to which the new blocks will be written.

In Step 410, blocks are stored in the hash chains. In one or more embodiments, the blocks are stored in the hash chains by updating the end block identifiers of the hash chains to identify the newly generated blocks and append the newly generated blocks to their respective hash chains.

Figure 5:
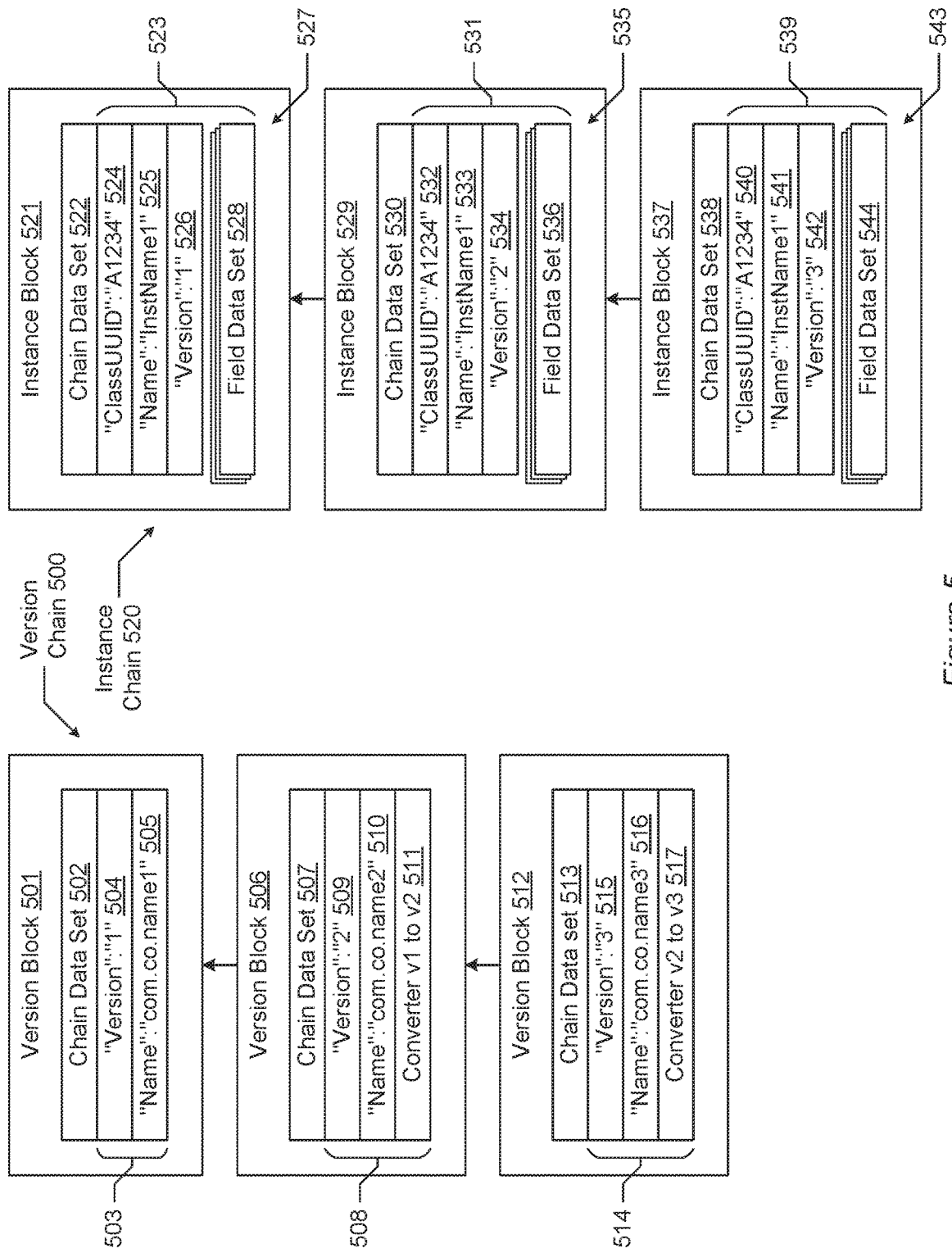
FIG. 5 and FIG. 6 show examples in accordance with one or more embodiments of the present disclosure.
Figure 6:
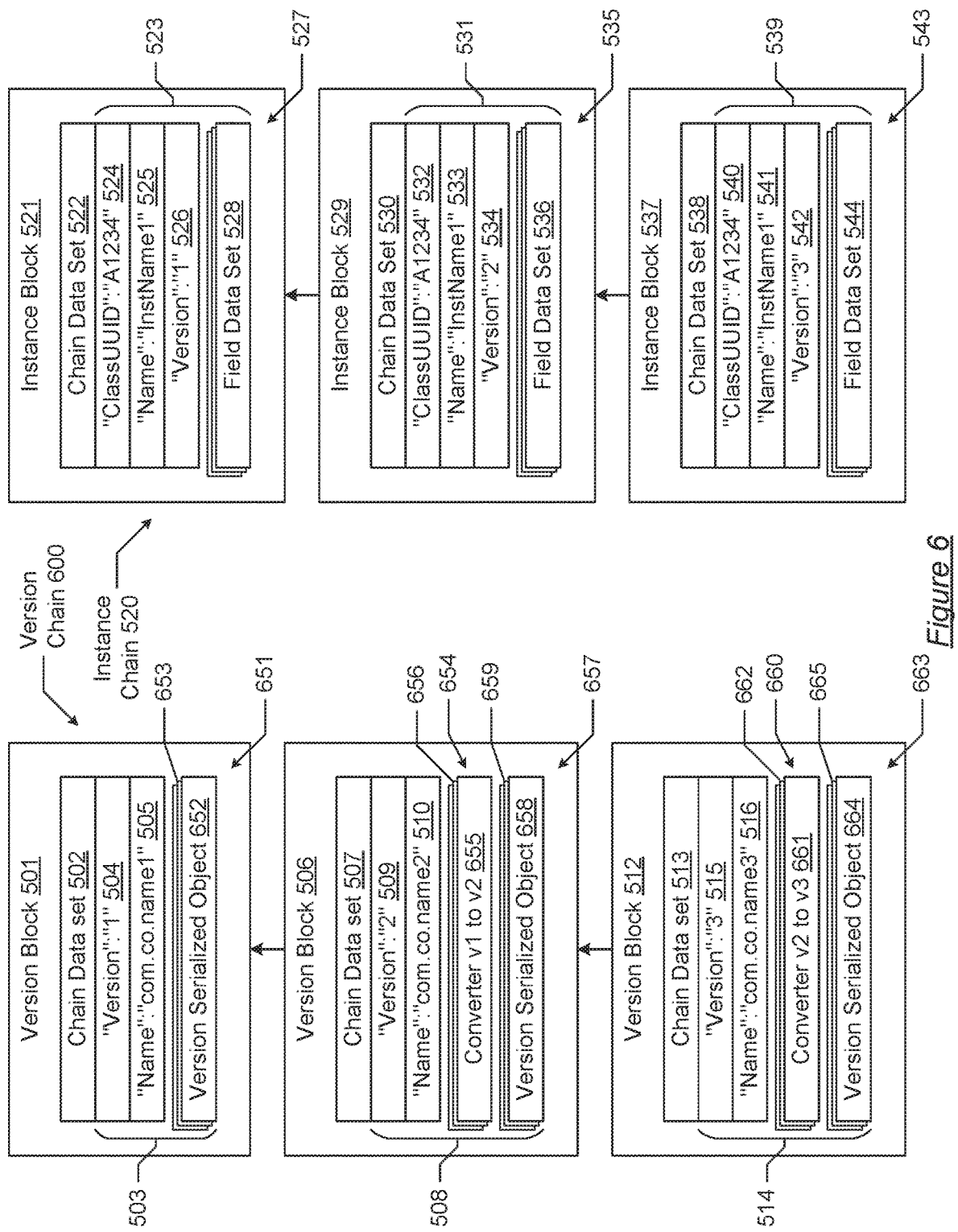

FIGS. 5 and 6 show examples of hash chains with version chains and instance chains. A memory may include one or more of the hash chains from the hash chains shown in FIGS. 5 and 6.

Referring to FIG. 5, the version chain (500) includes the version blocks (501, 506, 512) and the instance chain (520) includes the instance blocks (521, 529, 537). In one or more embodiments, one or more of the blocks and data shown in FIG. 5 may be omitted, repeated, combined, and/or rearranged. Accordingly, the scope of the present disclosure should not be considered limited to the specific arrangement of blocks and data shown in FIG. 5.

In one or more embodiments, the version block (501) is the genesis block of the version chain (500). The version block (501) includes the chain data set (502) and the field data sets (503).

In one or more embodiments, the chain data set (502) includes a hash value and a prior block identifier. The hash value in the chain data set (502) is based on the field data sets (503). The prior block identifier of the chain data set (502) identifies the version block (501) itself as the prior block since the version block (501) is the genesis block of the version chain (500).

In one or more embodiments, the field data sets (503) include the field data set (504) and the field data set (505). The field data set (504) has a name of "Version" and a value of "1" to identify the version of the class represented by the version block (501). The field data set (505) has a name of "Name" and a value of "com.co.name1" to identify the fully qualified class name of the class for the version of the class represented by the version block (501). No converter function is included in the version block (501) because there is no previous version from which to convert.

In one or more embodiments, the version block (506) is the second block of the version chain (500). The version block (506) includes the chain data set (507) and the field data sets (508).

In one or more embodiments, the prior block identifier of the chain data set (507) identifies the version block (501) as the prior block. The hash value of the chain data set (507) is generated from the hash value from the chain data set (502) of the version block (501) and from the field data sets (508) of the version block (506).

In one or more embodiments, the field data sets (508) include the field data sets (509, 510, 511). The field data set (509) identifies the version of the class represented by the version block (506) as being version 2. The field data set (510) identifies the fully qualified class name for version 2 of the class as being "com.co.name2". The field data set (511) is a serialized converter function that, after being deserialized, takes the version 1 fields of the class as input and outputs the version 2 fields of the class.

In one or more embodiments, the converter function is agnostic to the programming language. The serialization format may be JavaScript Object Notation (JSON) (i.e., a runtime object is serialized into a JSON formatted text string with all of the pertinent data from the runtime object) and the converter function may operate on the serialized object in JSON format. As an example, the converter function splits a "name" field from a serialized object in JSON format, which was saved using a prior class version, to a "firstName" and "lastName" set of fields for the new class version. The converted fields in JSON format may be stored independently or loaded into a runtime object, which may be independent of the programming language used for the runtime object.

The version block (512) is the third block of the version chain (500). The version block (512) includes the chain data set (513) and the field data sets (514).

In one or more embodiments, the prior block identifier of the chain data set (513) identifies the version block (506) as the prior block. The hash value of the chain data set (513) is generated from the hash value from the chain data set (507) of the version block (506) and from the field data sets (514) of the version block (512).

The field data sets (514) include the field data sets (515, 516, 517). The field data set (515) identifies the version of the class represented by the version block (512) as being version 3. The field data set (516) identifies the fully qualified class name for version 3 of the class as being "com.co.name3". The field data set (517) is a serialized converter function that, after being deserialized, takes the version 2 fields of the class as input and outputs the version 3 fields of the class.

The instance block (521) is the genesis block of the instance chain (520). the instance block (521) includes the chain data set (522) and the field data sets (523).

In one or more embodiments, the chain data set (522) includes a hash value and a prior block identifier. The hash value in the chain data set (502) is based on the field data sets (523). The prior block identifier of the chain data set (522) identifies the instance block (521) itself as the prior block since the instance block (521) is the genesis block of the instance chain (520).

In one or more embodiments, the field data sets (523) include the field data sets (524, 525, 526, 527). The field data set (524) has a name of "ClassUUID" and a value of "A1234" to identify the class that defines the object represented by the instance block (521). The field data set (525) has a name of "Name" and a value of "InstName1" to identify the name of the object represented by the instance block (521). The field data sets (527) include the field data set (528). In one or more embodiments, the field data sets (527) includes the field names and values for the object represented by the instance block (521). In additional embodiments, the field data sets (523) includes only a single field data set that includes a serialized object, which is the object represented by the instance block (521) in a serialized form. When the serialized object is the field data set of the instance block (521), the other field data sets are not included and the names and values (such as for the class identifier and the class version identifier) are found within the serialized object within the field data set.

In one or more embodiments, the object represented by the instance block (521) may be loaded into a runtime object using the version block (501) from the version chain (500). As further discussed below, to load the runtime object, the correct version chain is identified, the correct version block is identified, converter functions are applied as needed, and the object is then loaded.

In one or more embodiments, the version chain (500) is identified as correctly matching the instance block (521). The version chain (500) is matched to the instance block (521) based on the class identifier ("A1234") from the field data set (524) matching the class identifier that is associated with the version chain (500).

After locating the correct version chain (500), the version ("1") from the instance block (521) is compared to the current version of the class, which is identified in the tail version block (512) as being version 3 from the field data set (515). The version ("1") of the instance block (521) does not match the version ("3") of the version block (512) and the next version block (506) in the version chain (500) is tested for the correct version. The version ("2") of the version block (506) also does not match the version ("1") of the instance block (521). The next version block (501) is subsequently tested and matched to the instance block (521).

After locating the version block (501) that matches the version of the instance block (521), the field names and values for the object that are stored within the field data sets (523) are extracted into a map. Since the version block (501) is the genesis block of the version chain (500) and since the version of the instance block matches the version of the version block, there is no conversion needed for the field names and values in the map. Next, the converter function from the field data set (511) is applied to the map of field names and values to convert those version 1 field names and values to version 2 field names and values and generate a converted version 2 map. The version 2 map is representative of version 2 of the class and is not ready to be instantiated since the current version of the class is version 3. Next, the converter function from the field data set (517) is applied to the version 2 map to generate a converted version 3 map.

After converting the field names and values from the instance block (521) to version 3 field names and values in the version 3 map, the object is loaded. A deserializer function is applied to the version 3 map that construct the runtime object with the appropriate field names and values converted from the instance block (521).

In one or more embodiments, the object represented by the instance block (529) may be loaded into a runtime object using a similar process to that of loading an object for the instance block (521). For the instance block (529), the version chain (500) is again matched as the correct chain. The version block (506) is identified has the matching version block for the instance block (529) based on the field data set (509) of the version block (506) matching the version ("2") identified in the field data set (534) of the instance block (529). The field names and values are extracted from the field data sets (531) of the instant block (529) and are converted to the current version ("3") by applying the converter function from the field data set (517) from the version block (512). After converting the extracted values, a version 3 instance of the object is created using the converted values.

In one or more embodiments, the object represented by the instance block (537) may be loaded into a runtime object without having to convert the field of names and values. The version ("3") of the instance block (537) matches the current version of the class and no converter functions are applied to the field names and values. A runtime object is created directly from the field names and values stored within the field data sets (531).

Referring to FIG. 6, the version blocks of the version chain (600) includes one or more converter functions and version serialized objects. In one or more embodiments, one or more of the blocks and data shown in FIG. 6 may be omitted, repeated, combined, and/or rearranged. Accordingly, the scope of the present disclosure should not be considered limited to the specific arrangement of blocks and data shown in FIG. 6.

In one or more embodiments, the version blocks (501, 506, 512) of FIG. 6 are different from the version blocks shown in FIG. 5 by the inclusion of version serialized objects and multiple converter functions. The instance chain (520) and instance blocks (521, 529, 537) of FIG. 6 are similar to those of FIG. 5.

In one or more embodiments, the version block (501) includes the version serialized objects (651). The version serialized objects (651) correspond to specific programming language runtime environments. The version serialized objects (651) include the version serialized object (652) and (653). In one or more embodiments, deserializing the version serialized object (652) generates a runtime object of version 1 of the class for the Java runtime environment and deserializing the version serialized object (653) generates a runtime object of version 1 of the class for the Python runtime environment.

In one or more embodiments, the version block (506) includes the converter functions (654), which have been serialized. The converter functions (654) convert version 1 field names and values to version 2 field names and values. The converter functions (654) correspond to different programming language environments and are serialized using the different programming language environments. In one or more embodiments, the converter function (655) is serialized using the Java runtime environment and, after being deserialized, may be used to convert field names and values for objects in the Java runtime environment. In one or more embodiments, the converter function (656) is used in conjunction with the Python language and runtime environment. Additional programming languages and environments may be used.

In one or more embodiments, the version block (506) includes the version serialized objects (657). The version serialized objects (657) include the version serialized objects (658) and (659), which correspond to specific programming language runtime environments and may be used to instantiate versions of the object in accordance with version 2 of the class.

In one or more embodiments, the version block (512) includes the converter functions (660). The converter functions (660) include the converter functions (661) and (662), which correspond to specific programming language runtime environments and may be used to convert fields from version 2 of the class to version 3 of the class.

In one or more embodiments, the version block (512) includes the version serialized objects (663). The version serialized objects (663) include the version serialized objects (664) and (665), which correspond to specific programming language runtime environments and may be used to instantiate versions of the object in accordance with version 2 of the class.

Embodiments may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (700) in FIG. 7A may be connected to or be a part of a network. For example, as shown in FIG. 7B, the network (720) may include multiple nodes (e.g., node X (722), node Y (724)). Nodes may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform at least a portion of one or more embodiments of the disclosure.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the disclosure, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the disclosure.

While the disclosure has been described with respect to a limited number of embodiments, those skilled in the art, having benefit of this disclosure, will appreciate that other embodiments may be devised which do not depart from the scope of the disclosure. Accordingly, the scope of the disclosure should be limited only by the attached claims.

What is claimed is:

1. A method comprising:
locating a version chain of a class for a serialized object in an instance block of an instance chain,
wherein the version chain is a first hash chain with an immutable sequence of version blocks, and
wherein the instance chain is a second hash chain with an immutable sequence of instance blocks including the instance block;
comparing a class version of the serialized object to a current version of the class;
when the class version of the serialized object matches the current version of the class, loading a runtime object by deserializing the serialized object;
when the class version of the serialized object does not match the current version of the class:
locating a version block in the immutable sequence of version blocks of the version chain that matches the class version of the serialized object;
extracting one or more field values from the serialized object;
applying a converter function from the version block to the one or more field values to generate one or more converted field values; and
loading the runtime object that matches the current version with the one or more converted field values.

2. The method of claim 1, further comprising:
when the class version of the serialized object does not match the current version of the class:
loading the runtime object from the serialized object.

3. The method of claim 1, further comprising:
retrieving a fully qualified class name of the class from a tail block of the version chain; and
loading the runtime object with the fully qualified class name of the class,
wherein the version block that matches the serialized object includes a previous class name that is different from the fully qualified class name of the class.

4. The method of claim 1, further comprising:
extracting the one or more field values from the serialized object into a map;
applying the converter function from the version block to the map to generate a converted map; and
loading the runtime object by applying a deserializer function to the converted map to generate a runtime object that matches the current version.

5. The method of claim 1,
wherein the version block includes a version serialized object, and
wherein a class version of the version serialized object matches the class version of the serialized object.

6. The method of claim 1, further comprising:
loading the runtime object using runtime reflection to inject the one or more converted field values into the runtime object.

7. The method of claim 1,
wherein the version block includes a plurality of converter functions that includes the converter function and that corresponds to a plurality of programming languages.

8. The method of claim 1, wherein the serialized object includes a nested serialized object and the steps of locating the version chain, comparing the class version, and loading the serialized object are repeated for the nested serialized object.

9. The method of claim 1, further comprising:
applying a subsequent converter function to the one or more converted field values to generate the runtime object.

10. A system comprising:
a memory coupled to a computer processor;
the memory comprising a runtime object, wherein the runtime object executes on the computer processor, uses the memory, and is constructed by:
   locating a version chain of a class for a serialized object in an instance block of an instance chain,
      wherein the version chain is a first hash chain with an immutable sequence of version blocks, and
      wherein the instance chain is a second hash chain with an immutable sequence of instance blocks including the instance block;
   comparing a class version of the serialized object to a current version of the class;
   when the class version of the serialized object matches the current version of the class, loading a runtime object by deserializing the serialized object;
   when the class version of the serialized object does not match the current version of the class:
      locating a version block in the immutable sequence of version blocks of the version chain that matches the class version of the serialized object;
      extracting one or more field values from the serialized object;
      applying a converter function from the version block to the one or more field values to generate one or more converted field values; and
      loading the runtime object that matches the current version with the one or more converted field values.

11. The system of claim 10, wherein the runtime object is further constructed by:
   when the class version of the serialized object does not match the current version of the class:
      loading the runtime object from the serialized object.

12. The system of claim 10, wherein the runtime object is further constructed by:
   retrieving a fully qualified class name of the class from a tail block of the version chain; and
   loading the runtime object with the fully qualified class name of the class,
      wherein the version block that matches the serialized object includes a previous class name that is different from the fully qualified class name of the class.

13. The system of claim 10, wherein the runtime object is further constructed by:
   extracting the one or more field values from the serialized object into a map;
   applying the converter function from the version block to the map to generate a converted map; and
   loading the runtime object by applying a deserializer function to the converted map to generate a runtime object that matches the current version.

14. The system of claim 10,
wherein the version block includes a version serialized object, and
wherein a class version of the version serialized object matches the class version of the serialized object.

15. The system of claim 10, wherein the runtime object is further constructed by:
   loading the runtime object using runtime reflection to inject the one or more converted field values into the runtime object.

16. The system of claim 10, wherein the version block includes a plurality of converter functions that includes the converter function and that corresponds to a plurality of programming languages.

17. The system of claim 10, wherein the serialized object includes a nested serialized object and the steps of locating the version chain, comparing the class version, and loading the serialized object are repeated for the nested serialized object.

18. The system of claim 10, wherein the runtime object is further constructed by:
   applying a subsequent converter function to the one or more converted field values to generate the runtime object.

19. A system comprising:
a memory coupled to a computer processor;
the memory comprising a runtime object, wherein the runtime object executes on the computer processor, uses the memory, and is constructed by:
   locating a version chain of a class for a serialized object in an instance block of an instance chain,
      wherein the version chain is a first hash chain with an immutable sequence of version blocks, and
      wherein the instance chain is a second hash chain with an immutable sequence of instance blocks including the instance block;
   comparing a class version of the serialized object to a current version of the class;
   when the class version of the serialized object does not match the current version of the class:
      locating a version block in the immutable sequence of version blocks of the version chain that matches the class version of the serialized object;
      extracting one or more field values from the serialized object;
      applying a converter function from the version block to the one or more field values to generate one or more converted field values;
      applying a subsequent converter function to the one or more converted field values to generate the runtime object; and
      loading the runtime object that matches the current version with the one or more converted field values.

20. The system of claim 19, wherein the runtime object is further constructed by:
   retrieving a fully qualified class name of the class from a tail block of the version chain; and
   loading the runtime object with the fully qualified class name of the class,
      wherein the version block that matches the serialized object includes a previous class name that is different from the fully qualified class name of the class.

* * * * *